United States Patent
Nagashima

(10) Patent No.: US 7,417,937 B2
(45) Date of Patent: Aug. 26, 2008

(54) OPTICAL PICKUP APPARATUS

(75) Inventor: Kenji Nagashima, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 577 days.

(21) Appl. No.: 11/053,664

(22) Filed: Feb. 9, 2005

(65) Prior Publication Data

US 2005/0180292 A1    Aug. 18, 2005

(30) Foreign Application Priority Data

Feb. 10, 2004    (JP)    ............ P2004-032922

(51) Int. Cl.
*G11B 7/00*    (2006.01)
(52) U.S. Cl. ............ 369/112.17; 369/112.23; 369/53.19; 369/44.32
(58) Field of Classification Search ............ 369/112.01, 369/53.19, 112.23, 112.24, 112.21, 112.09
See application file for complete search history.

(56) References Cited

U.S. PATENT DOCUMENTS

| | | | | |
|---|---|---|---|---|
| 4,709,139 | A * | 11/1987 | Nakamura et al. ........ | 250/201.5 |
| 6,256,272 | B1 * | 7/2001 | Yoon ........................ | 369/44.23 |
| 6,353,587 | B1 * | 3/2002 | Hong et al. ............ | 369/112.15 |
| 6,611,383 | B1 * | 8/2003 | Lee ........................... | 359/629 |
| 6,873,469 | B2 * | 3/2005 | De Vaan et al. ............ | 359/629 |
| 2001/0028625 | A1 | 10/2001 | Asada et al. | |
| 2003/0081322 | A1 | 5/2003 | De Vaan et al. ............ | 359/634 |
| 2004/0004774 | A1 | 1/2004 | Fujita | |

FOREIGN PATENT DOCUMENTS

| | | |
|---|---|---|
| EP | 0 602 732 | 6/1994 |
| JP | 60-111058 U | 7/1985 |
| JP | 62-102437 A | 5/1987 |
| JP | 6-162549 A | 6/1994 |
| JP | 2000-311371 A | 11/2000 |
| JP | 2001-6205 | 1/2001 |
| JP | 2001-344801 | 12/2001 |
| JP | 3392904 B | 1/2003 |
| JP | 2003-123305 A | 4/2003 |
| JP | 2003-317302 | 11/2003 |

OTHER PUBLICATIONS

Machine Translation of JP Publication No. 2001006205 on Jan. 12, 2001 by Asakawa Hideki.*

* cited by examiner

*Primary Examiner*—Wayne Young
*Assistant Examiner*—Linh T Nguyen
(74) *Attorney, Agent, or Firm*—Morgan, Lewis & Bockius LLP

(57) ABSTRACT

Astigmatism of a beam of first laser light is cancelled at a position separated from first optical element by a predetermined distance on an optical axis of the beam of first laser light by refracting to transmit the beam of the first laser light by being refracted by rotating by a predetermined angle around an axis orthogonal to the optical axis of the beam of the first laser light, refracting a beam of second laser light to coincide with the optical axis of the beam of the first laser light and rotating by a predetermined angle around a second axis orthogonal thereto.

3 Claims, 5 Drawing Sheets

OPTICAL PICKUP APPARATUS

BACKGROUND OF THE INVENTION

1. Field of the Invention

The present invention relates to an optical pickup apparatus for respectively recording and reproducing information respectively to and from optical disks having different board thicknesses of DVD (Digital Versatile Disk), CD (Compact Disk) or the like, particularly relates to an optical pickup apparatus capable of providing excellent spot light of a beam of laser light eliminating astigmatism and comma aberration.

2. Description of the Related Art

In a background art, according to an optical pickup apparatus using two laser diodes for emitting beams of laser light having different wave length, as shown by FIG. 3, a beam A of laser light emitted from a laser diode 11 is made to transmit a dichroic prism 13 and a deflecting beam splitter 14, further, a beam B emitted from a laser diode 12 is refracted by the dichroic prism 13 to coincide with an optical axis of the beam A, refracted in a direction orthogonal to an information recording face of an optical disk 21 to constitute a parallel beam by a collimator lens 16, deflected from elliptically polarized light to linearly polarized light by a quarter-wave prism 17 and is converged into spot light of the beam of laser light to the optical disk 21 by an object lens 18, and reflected light thereof is refracted in a direction of an optical detecting element 20 by the deflecting beam splitter 14 and is detected by the optical detecting element 20 via a cylindrical lens 19. Therefore, the dichroic prism 13 and the deflecting beam splitter 14 which are expensive optical parts are needed, and there poses a problem that a number of pieces of optical parts is increased and the optical pickup apparatus becomes expensive. Further, in reference to FIG. 4, two parallel flat plate half mirrors 33, 34 are used in place of the dichroic prism 13 and the deflecting beam splitter 14 which are the expensive optical parts of FIG. 3, a beam A of laser light emitted from a laser diode 31 is refracted to transmit by the parallel flat plate half mirrors 33, 34 arranged by angles orthogonal to an optical axis (in the drawing, the parallel flat plate half mirrors 33, 34 are shown simplifiedly two-dimensionally) further, a beam of laser light emitted from a laser diode 32 is refracted by the parallel flat plate half mirror 34 to coincide with the optical axis of the beam A of laser light, refracted by a total reflection mirror 35 in a direction orthogonal to an information recording face of an optical disk 40 to constitute a parallel beam by a collimator lens 36, deflected from elliptically polarized light to linearly polarized light by a quarter-wave plate 37 and is converged to spot light of the beam of laser light to the optical disk 40 by an object lens 38, and reflected light thereof is refracted in a direction of the optical detecting element 39 by the parallel flat plate half mirror 33 and is detected by the optical detecting element 39. However, when the beam of laser light emitted from the laser diode 31 is refracted to pass by the two parallel flat plate half mirrors 33, 34, astigmatism and comma aberration are generated and there poses a problem that excellent spot of the beam of laser light cannot be converged to the information recording face of the optical disk 40.

There is a background art in which a first parallel flat plate half mirror is arranged relative to an optical axis of Z axis of a beam of laser light emitted from one laser diode of two laser diodes having different wave lengths by being inclined around Y axis by an angle q, a second parallel flat plate half mirror having a plate thickness the same as that of the first parallel flat plate half mirror is arranged by being inclined around X axis by an angle q, the beam of laser light emitted from the one laser diode is successively refracted to transmit the first and the second parallel flat plate half mirrors, and the laser beam emitted from other laser beam diode is reflected by the second parallel flat plate half mirror to coincide the optical axes of the beams of laser light emitted from the two laser diodes having the different wave lengths (refer to, for example, JP-A-2001-006205).

Further, there is a configuration in which an inclination adjusting member is brought into contact with a lens, and by conducting electricity to a solenoid coil provided at a movable support member and a magnet provided at a fixed member in a state of bringing the inclination adjusting member into contact with the lens, the movable support member is displaced and an inclination of the lens is adjusted by pressing the lens to the inclination adjusting member (refer, for example, Japanese Patent Publication No. 3392904).

Further, there is a configuration in which first laser light from a first laser diode is reflected by a parallel flat plate half mirror, a reflected beam of the first laser light is converged by a converging lens, the converged beam of first laser light is shaped by a beam shaping prism and is converged to a first optical disk in correspondence with the first laser light, laser light from a second laser diode transmitted through a parallel flat plate half mirror is provided with astigmatism, second laser light from the second laser diode is converged to a second optical disk in correspondence with the second laser light, and astigmatism generated in passing a beam of the second light through the beam shaping prism is reduced (refer to, for example, JP-A-2001-344801).

Further, beams of respective laser light emitted from laser diodes for emitting two or more of beams of laser light having different wave lengths are converged by an object lens, beams of respective laser light reflected by an optical disk and passing through an object lens are detected by an optical detecting element, positions of returning the beams of respective laser light emitted from the laser diodes on optical paths between the laser diodes and the optical detecting element are made to coincide with each other at a light receiving face of the optical detecting element, and comma aberration is corrected by a hologram optical element (refer to, for example, JP-A-2003-317302).

SUMMARY OF THE INVENTION

However, according to the configuration disclosed in JP-A-2001-006205, the first parallel flat plate half mirror is arranged to incline by the angle θ relative to the optical axis of Z axis of the beam of laser light emitted from the one laser diode of the two laser diodes having different wave lengths, the second parallel flat plate half mirror having the plate thickness the same as that of the first parallel flat plate half mirror is arranged to incline by the angle θ around X axis, the beam of laser light emitted from the one laser diode is successively refracted to transmit the first and the second parallel flat plate half mirrors, the laser beam emitted from the other laser diode is reflected by the second parallel flat plate half mirror, thereby, the optical axes of the beams of laser light emitted from the two laser diodes having the different wave lengths can coincide with each other, however, it is difficult to eliminate astigmatismand comma aberration.

According to the configuration disclosed in Japanese Patent Publication No. 3392904, the inclination adjusting member is brought into contact with the lens, in the state of bringing the inclination adjusting member into contact with the lens, by conducting electricity to the solenoid coil provided at the movable supporting member and the magnet provided at the fixed member, the movable supporting member is displaced, and the inclination of the lens can be adjusted by pressing the lens to the inclination adjusting member, however, the next configuration does not realize an optical pickup apparatus at low cost by reducing cost by a small number of parts.

According to the configuration disclosed in JP-A-2001-344801, the first laser beam from the first laser diode is reflected by the parallel flat plate half mirror, the reflected beam of the first laser light is converged by the converging lens, the converged beam of first laser light is shaped by the beam shaping prism and converged to the first optical disk in correspondence with the first laser light, predetermined astigmatism is provided to the laser light from the second laser diode transmitting the parallel flat plate half mirror, the second laser beam from the second laser diode is converged to the second optical disk in correspondence with the second laser light, and astigmatism generated in passing the second laser light through the beam shaping prism can be reduced, however, similar to the above-described, the configuration does not realize an optical pickup apparatus at low cost by reducing cost by a small number of pieces of parts.

According to the configuration disclosed in JP-2003-317302, the beams of respective laser light emitted from the laser diodes for emitting two or more of laser beams having the different wave lengths are converged by the object lens, the beams of respective laser light reflected by the optical disk and passing through the object lens is detected by the optical detecting element, the positions of returning the beams of respective laser light emitted from the laser diodes on the optical paths between the laser diodes and the optical detecting element are made to coincide with each other at the light receiving face of the optical detecting element, and comma aberration can be corrected by the hologram optical element, however, the hologram optical element needs to use, and the configuration does not realize an optical pickup apparatus at low cost.

The invention has been carried out in view of the above-described problems of the background arts and it is an object thereof to provide an optical pickup apparatus capable of providing excellent spot light of a beam of laser light reducing cost by a small number of parts without using an expensive optical part and without deteriorating a function of the optical pickup apparatus and eliminating astigmatism and comma aberration.

According to a first aspect of the invention, there is provided an optical pickup apparatus including: a first laser diode that emits a first laser beam having a first wave length; a second laser diode that emits a second laser beam having a second wave length that is different from the first wave length; a first optical element arranged on an optical axis of the first laser beam for refracting and transmitting the first laser beam therethrough, the first optical element being rotated by a first angle around a first axis orthogonal to the optical axis of the first laser beam and having a first refractive index; a second optical element arranged on the optical axis of the first laser beam that is transmitted through the first optical element for refracting and transmitting the first laser beam therethrough, and arranged on an optical axis of the second laser beam for refracting the second laser beam to coincide the optical axis of the second laser beam with the optical axis of the first laser beam, the second optical element being arranged at a position separated from the first optical element by a predetermined distance on the optical axis of the first laser beam, being rotated by a second angle around a second axis orthogonal to the optical axis of the first laser beam and the first axis, and having a second refractive index that cancels an astigmatism of the first laser beam; and a tilt angle correcting unit that corrects a tilt angle of an optical system including the first and the second optical elements and cancels a comma aberration generated in a radial direction of an optical disk, wherein the first and the second optical elements are formed to have same thickness, and wherein the first and the second optical elements are made of a same optical material.

According to a second aspect of the invention, there is provided an optical pickup apparatus including: a first laser diode that emits a first laser beam having a first wave length; a second laser diode that emits a second laser beam having a second wave length that is different from the first wave length; a first optical element arranged on an optical axis of the first laser beam for refracting and transmitting the first laser beam therethrough, the first optical element being rotated by a first angle around a first axis orthogonal to the optical axis of the first laser beam and having a first refractive index; a second optical element arranged on the optical axis of the first laser beam that is transmitted through the first optical element for refracting and transmitting the first laser beam therethrough, and arranged on an optical axis of the second laser beam for refracting the second laser beam to coincide the optical axis of the second laser beam with the optical axis of the first laser beam, the second optical element being arranged at a position separated from the first optical element by a predetermined distance on the optical axis of the first laser beam, being rotated by a second angle around a second axis orthogonal to the optical axis of the first laser beam and the first axis, and having a second refractive index that cancels an astigmatism of the first laser beam; and a tilt angle correcting unit that corrects a tilt angle of an optical system including the first and the second optical elements and cancels a comma aberration generated in a radial direction of an optical disk.

BRIEF DESCRIPTION OF THE DRAWINGS

The above objects and advantages of the present invention will become more apparent by describing preferred exemplary embodiments thereof in detail with reference to the accompanying drawings, wherein.

DETAILED DESCRIPTION OF THE PREFERRED EMBODIMENTS

Referring now to the accompanying drawings, a description will be given in detail of a preferred embodiment of the invention.

Figure 1:
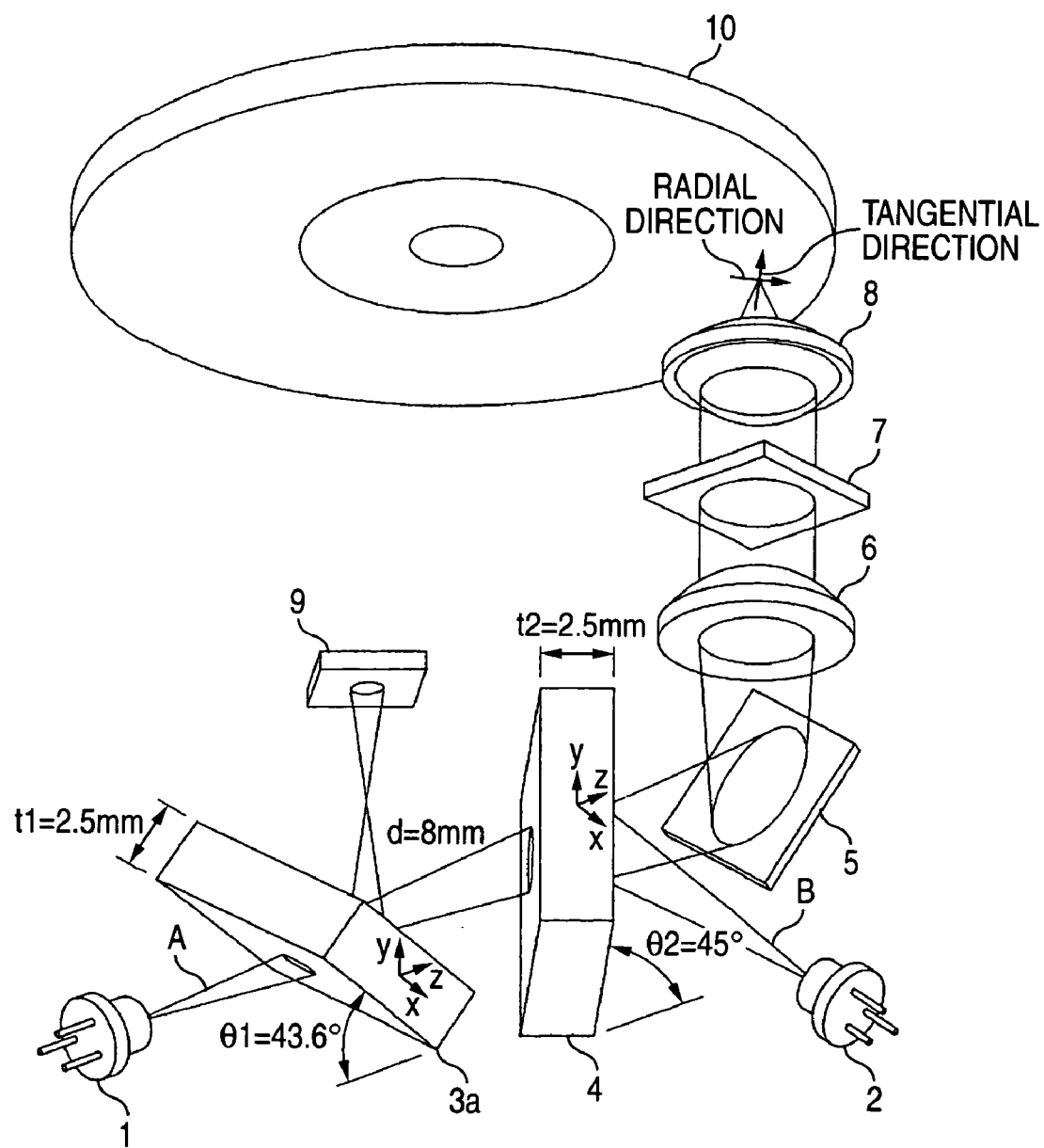
FIG. 1 is a perspective view showing a configuration of an optical pickup apparatus according to a first embodiment of the invention.
Figure 2:
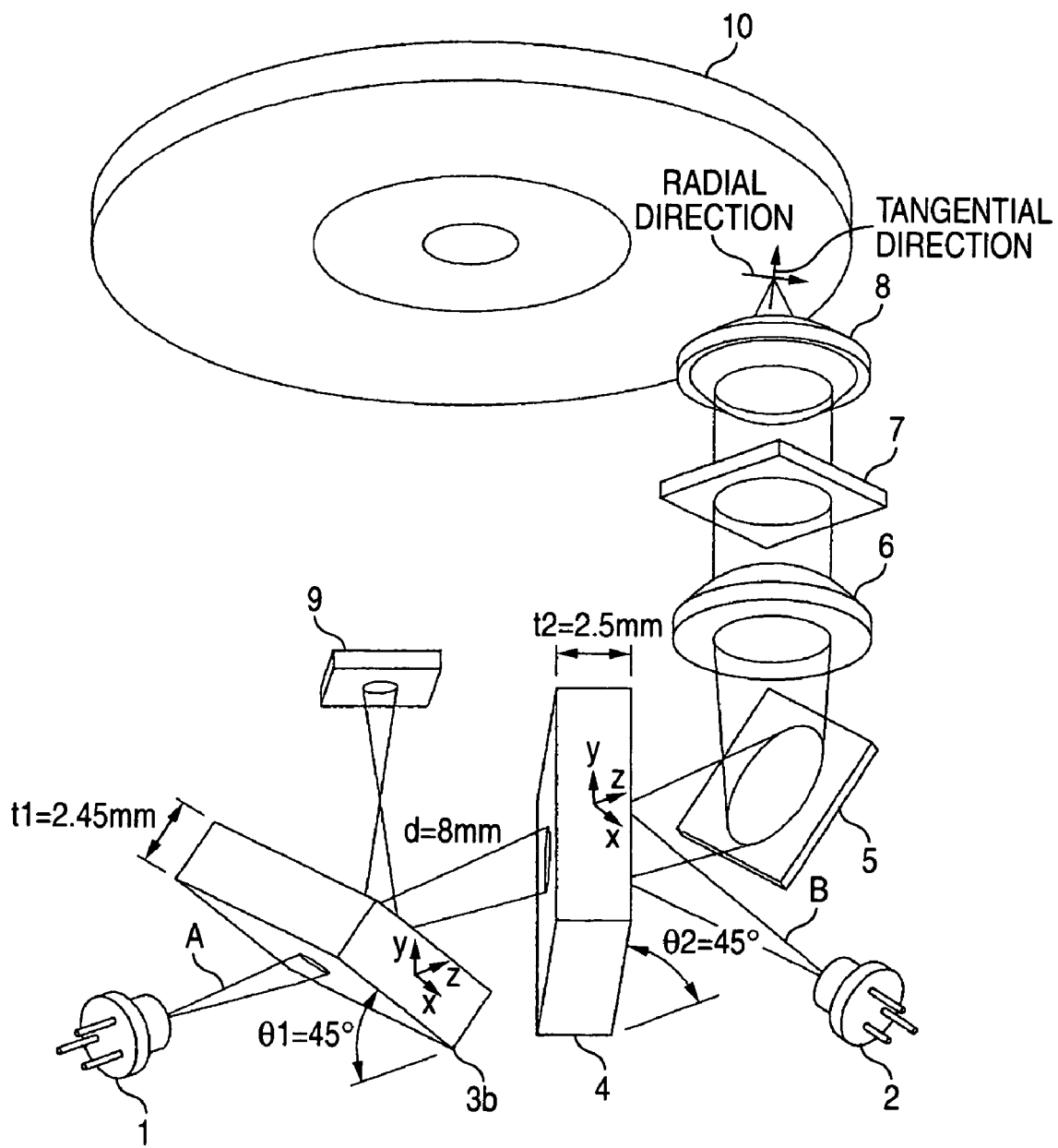
FIG. 2 is a perspective view showing a configuration of an optical pickup apparatus according to a second embodiment of the invention.
Figure 3:
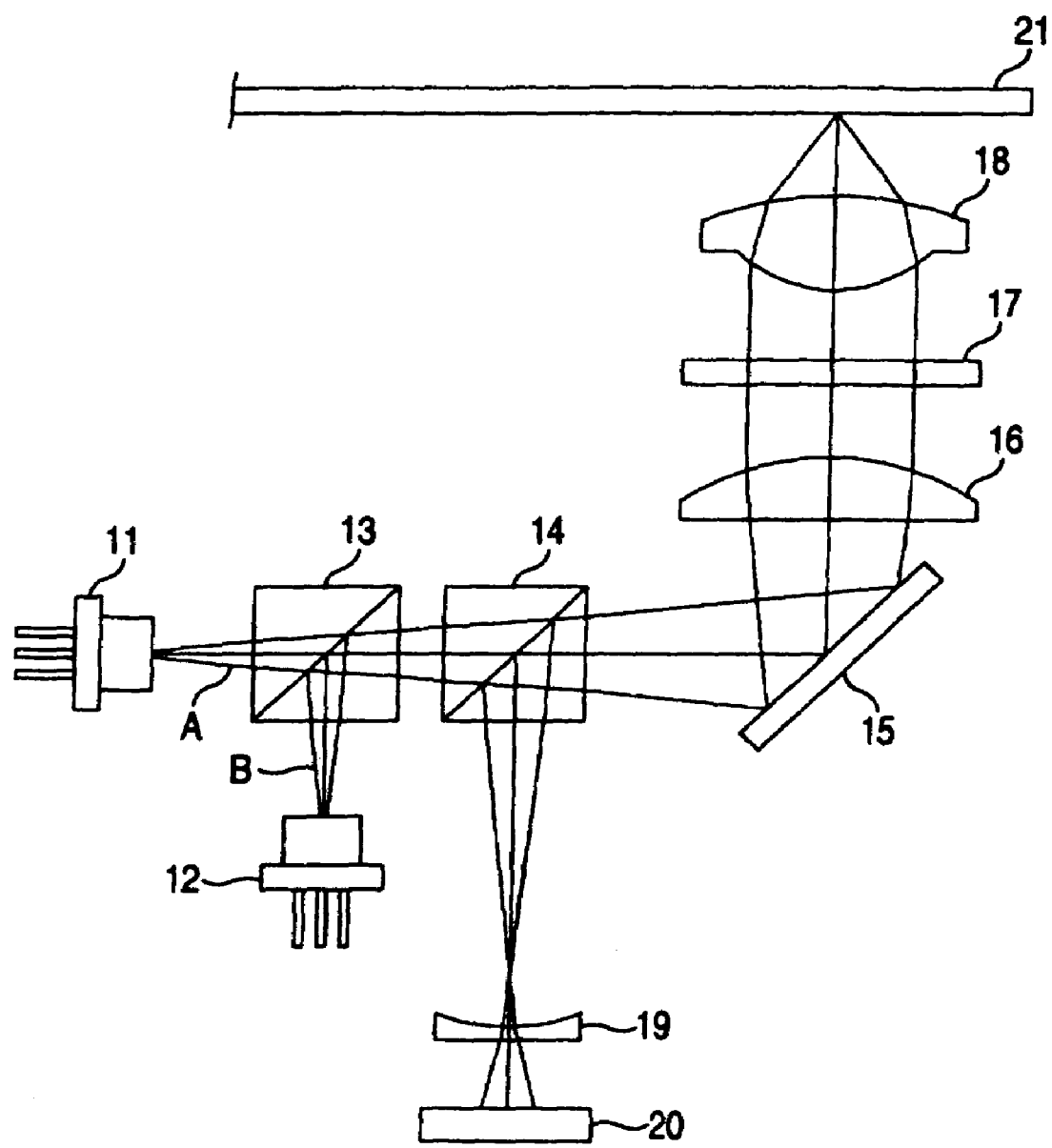
FIG. 3 is an explanatory view showing a configuration of an optical pickup apparatus of a background art.
Figure 4:
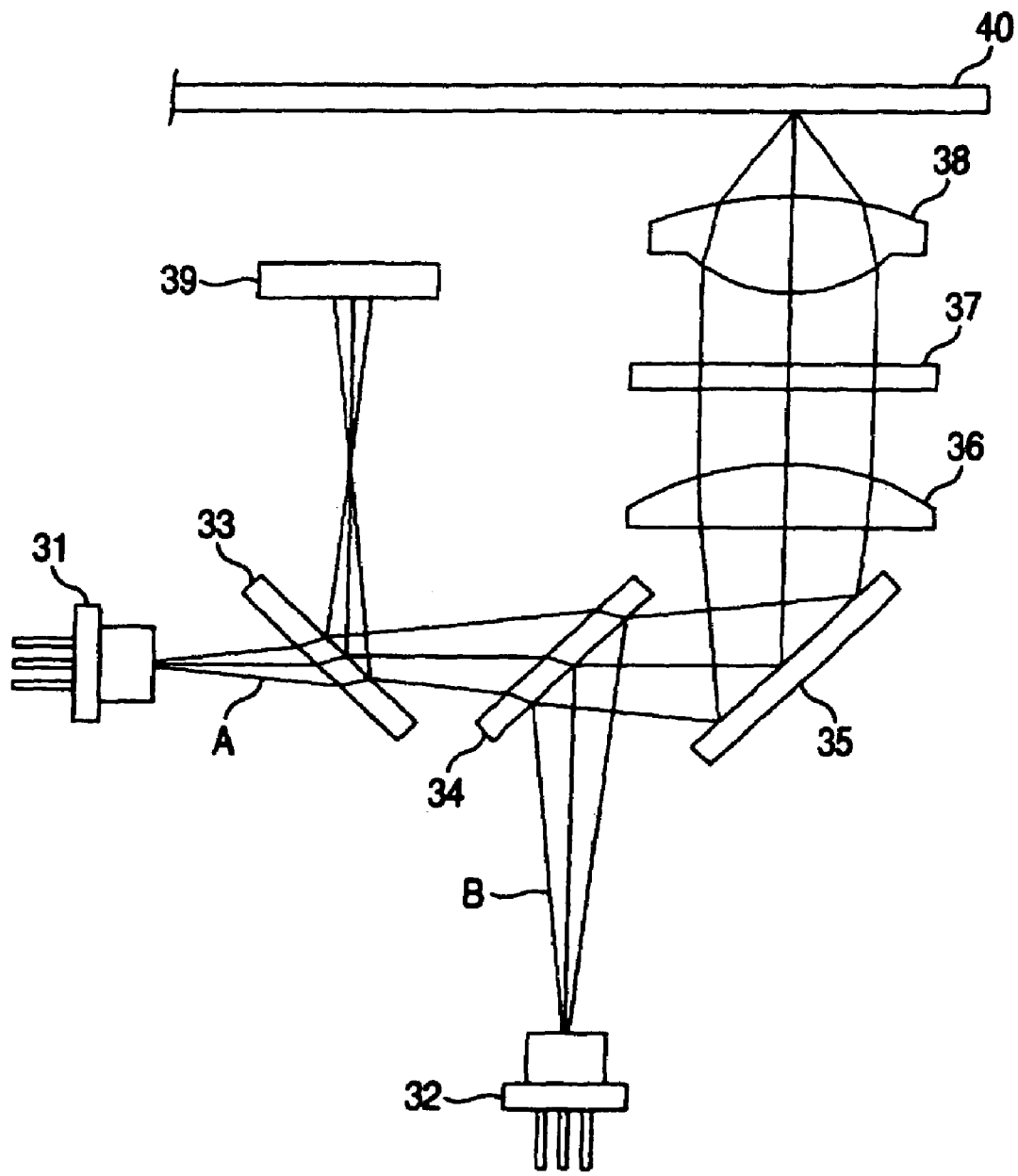
FIG. 4 is an explanatory view showing a configuration of other optical pickup apparatus of a background art.

FIG. 1 is a perspective view showing a configuration of an optical pickup apparatus according to a first embodiment of the invention, and FIG. 2 is a perspective view showing a configuration of an optical pickup apparatus according to a second embodiment of the invention.

First, an explanation will be given based on the perspective view of FIG. 1 showing the configuration of the optical pickup apparatus according to the first embodiment of the invention.

The optical pickup apparatus according to the first embodiment includes two of a laser diode 1 and a laser diode 2 for emitting beams of laser light respectively having different wave lengths. When a laser disk 10 is CD, a beam A of laser light having a wave length of 790 nm emitted from the laser diode 1 is converged to an information recording face of the optical disk 10 via an optical system, information is recorded and reproduced to and from the optical disk 10, reflected light of laser light reflected by the information recording face of the optical disk 10 is detected by an optical detecting element 9 and the information recorded to the optical disk 10 is read. Further, when the optical disk 10 is DVD, a beam B of laser light having a wave length of 660 nm emitted from the laser diode 2 is converged to the information recording face of the optical disk 10 via the optical system, information is recorded and reproduced to and from the optical disk 10, reflected light of laser light reflected by the information recording face of the optical disk 10 is detected by the optical detecting element 9 and information recorded to the optical disk 10 is read.

The beam A of laser light having the wave lengths of 790 nm emitted from the laser diode 1 is refracted to transmit a parallel flat plate half mirror 3a and a parallel flat plate half mirror 4 and is refracted in a direction orthogonal to the information recording face of the optical disk 10 by a total reflection mirror 5. The beam A of laser light refracted by the total reflection mirror 5 is made to constitute a parallel beam by a collimator lens 6 having a focal length of 20.05 mm, and deflected from elliptically polarized light to linearly polarized light by a quarter-wave plate 7, and a beam of laser light deflected to the linearly polarized light is converged by an object lens 8 having a focal length of 3.05 mm and a numerical aperture of 0.51 to the information recording face of the optical disk 10 having a thickness of 1.2 mm, that is, to a position at a depth of 1.2 mm of an inner face CD. Further, reflected light of laser light reflected by the information recording face of the optical disk 10 of CD is returned in a reverse direction through the optical system of the object lens 8, the quarter-wave plate 7, the collimator lens 6, the total reflection mirror 5 and the parallel flat plate half mirror 4 and refracted in a direction of the optical detecting element 9 by the parallel flat plate half mirror 3a, the reflected light from the information recording face of the optical disk 10 of CD is detected by the optical detecting element 9 and information recorded to the information recording face of CD is read.

The parallel flat plate half mirror 3a and the parallel flat plate half mirror 4 are parallel flat plate half mirrors of an optical glass material BK7 (borosilicate crown glass) having thicknesses of t1, t2=2.5 mm. As shown by FIG. 1, the parallel flat plate half mirror 3a is arranged by being rotated by an angle $\theta 1=43.6°$ around x axis orthogonal to an optical axis of z axis of the beam A of laser light. Further, as shown by FIG. 1, the parallel flat plate half mirror 4 is arranged by being rotated by an angle $\theta 2=45°$ around y axis orthogonal to the optical axis of z axis of the beam A of laser light at a position separated from the parallel flat plate half mirror 3a by a distance of d=8 mm on the optical axis of the beam A of laser light. When the parallel flat plate half mirror 3a and the parallel flat plate half mirror 4 of the optical glass material BK7 having the thicknesses of t1, t2=2.5 mm are arranged at the positions on the optical axis of the beam A of laser light separated from each other by the distance of d=8 mm in this way, by arranging the parallel flat plate half mirror 3a and the parallel flat plate half mirror 4 in a relationship of being twisted by a slightly small angle from an angle of 90° on the optical axis, canceling astigmatism of the beam A of laser light emitted from the laser diode 1 by the parallel flat plate half mirror 3a and the parallel flat plate half mirror 4 and adjusting the optical system such that a direction of generating comma aberration becomes a radial direction of the optical disk 10, the comma aberration generated in the radial direction of the optical disk 10 can be corrected by a tilt angle of the optical axes of a lens system comprising the collimator lens 6, the quarter-wave plate 7 and the object lens 8 of the optical pickup apparatus, or a tilt angle of the optical axis of the optical pickup apparatus by a tilt angle correcting actuator 100 and therefore, when the beam A of laser light emitted from the laser diode 1 is converged to the information recording face of the optical disk 10, excellent spot light eliminating astigmatism and comma aberration can be provided. Further, when the wave length is 790 nm, a refractive index of the optical glass material BK7 is 1.511.

Figure 5:
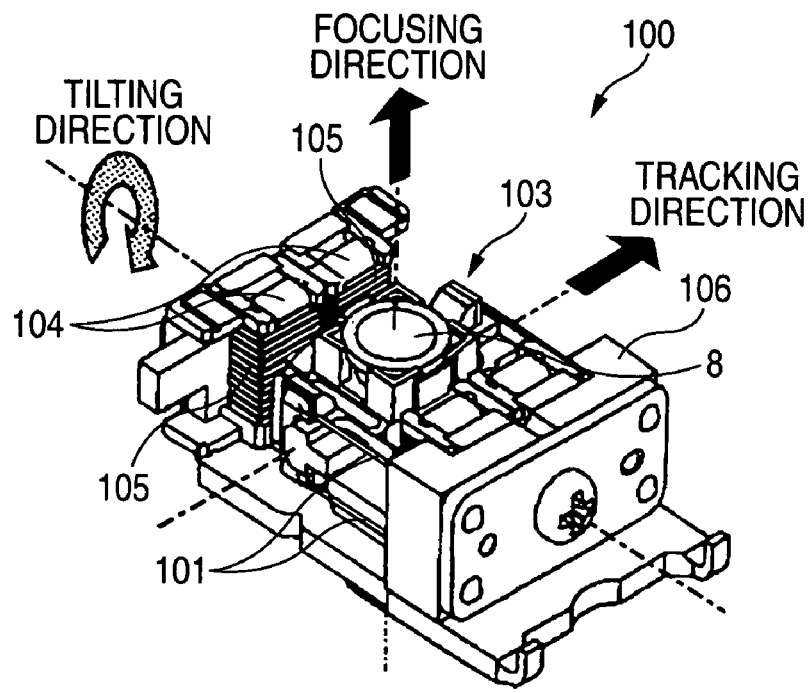
FIG. 5 is a perspective vies showing a configuration of a tilt angle correcting actuator.
Figure 6:
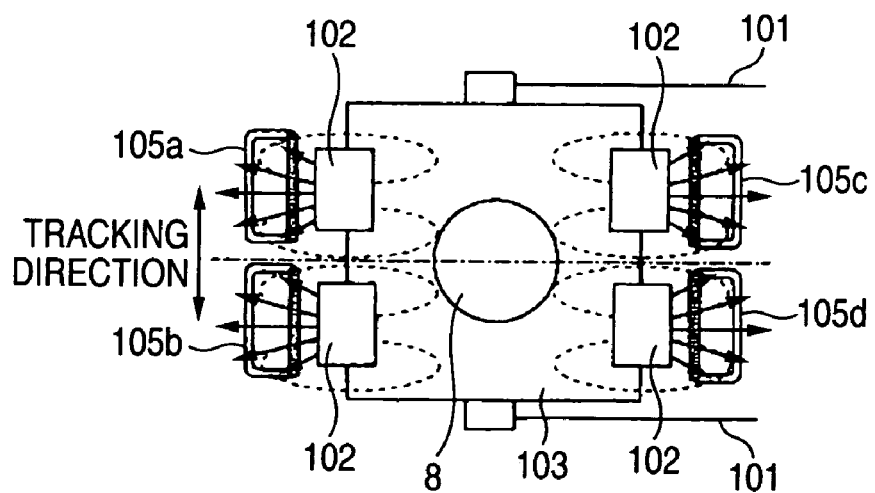
FIG. 6 is an explanatory view showing a top view of the tilt angle correcting actuator.

As shown in FIGS. 5 and 6, the tilt angle correcting actuator 100 includes a supporting section and an actuating section. The supporting section includes four wires 101 that support the object lens 8 to be twistable in a tilting direction. The actuating section includes: a plurality of magnets 102 provided on a movable unit 103 in which the optical system including the object lens 8 is provided; and a plurality of coils (tracking coils 104 and focusing coils 105) provided on a fixed unit 106.

FIG. 6 shows a top view of the tilt angle correcting actuator 100. As shown in FIG. 6, the focusing coils 105 includes four focusing coils 105a, 105b, 105c and 105d. The focusing coils 105a and 105c are provided at one side of the movable unit 103 with respect to the tracking direction, and the focusing coils 105b and 105d are provided at the other side of the movable unit 103. When moving the movable unit 103 in the tilting direction, the focusing coils 105a, 105c and the focusing coils 105b, 105d are activated in opposite phase. When moving the movable unit 103 in the focusing direction, the focusing coils 105a, 105b, 105c and 105d are activated in the same phase.

As described above, the tilt angle correcting actuator 100 is configured to be a type of a so-called moving magnet type.

In the embodiment, the tilt angle correcting actuator 100 serves as a tilt angle correcting unit that corrects a tilt angle of an optical system including the first and the second optical elements and cancels a comma aberration generated in a radial direction of an optical disk.

On the other hand, the laser diode 2 is arranged such that the beam B of laser light having the wave length of 660 nm emitted from the laser diode 2 is refracted by the parallel flat plate half mirror 4 to coincide with the optical axis of the beam A of laser light emitted from the laser diode 1. The beam B of laser light emitted from the laser diode 2 is refracted by the parallel flat plate half mirror 4 and is refracted in a direction orthogonal to the information recording face of the optical disk 10 by the total reflection mirror 5. Similar to the beam A of laser light, the beam B of laser light refracted by the total reflection mirror 5 is made to constitute a parallel beam by the collimator lens 6 and deflected from elliptically polarized light to linearly polarized light by the quarter-wave plate 7 and a beam of laser light deflected to linearly polarized light is converged by the object lens 8 to the information recording face of the optical disk 10 of DVD having the thickness of 1.2 mm, that is, a position at a depth of 0.6 mm of an inner face of DVD. Further, reflected light of laser light reflected by the information recording face of the optical disk 10 of DVD is returned in a reverse direction through an optical system of the object lens 8, the quarter-wave plate 7, the collimator lens 6, the total reflection mirror 5, and the parallel flat plate half mirror 4 and is refracted in a direction of the optical detecting element 9 by the parallel flat plate half mirror 3a, reflected light from the information recording face of the optical disk 10 of DVD is detected by the optical detecting element 9 and information recorded to the information recording face of DVD is read. Further, the beam B of laser light emitted from the laser diode 2 does not transmit through the parallel flat plate half mirror 4 and therefore, aberration is not generated.

According to the first embodiment, by arranging the parallel flat plate half mirror 3a of BK7 having the thickness of 2.5 mm on the optical axis of the beam A of laser light by being rotated around x axis by the angle $\theta 1=43.8°$, arranging the parallel flat plate half mirror 4 of BK7 having the thickness of 2.5 mm at the position on the optical axis of the beam A of laser light separated from the parallel flat plate half mirror 3a by the distance of 8 mm by being rotated in the counterclockwise direction around the y axis by the angle of $\theta 2=45°$ and adjusting the tilt angle of the optical axis of the lens system comprising the collimator lens 6, the quarter-wave plate 7 and the object lens 8 of the optical pickup apparatus, or the tilt angle of the optical axis of a total of the optical pickup apparatus by the tilt angle correcting actuator 100, excellent spot light of the beam A of laser light emitted from the laser diode 1 can be converged to the information recording face of the optical disk 10 and therefore, the excellent spot light of laser light reducing cost by a small number of pieces of parts and eliminating astigmatism and comma aberration can be provided without using an expensive optical part and without deteriorating the function of the optical pickup apparatus.

Further, an explanation will be given based on the perspective view of FIG. 2 showing the configuration of the optical pickup apparatus according to a second embodiment of the invention.

According to the optical pickup apparatus of the second embodiment, a parallel flat plate half mirror 3b is used in place of the parallel flat plate half mirror 3a according to the first embodiment. Further, constituent elements the same as those shown in FIG. 1 are attached with the same notations and an explanation thereof will be omitted. The beam A of laser light having the wave length of 790 nm emitted from the laser diode 1 is refracted to transmit the parallel flat plate half mirror 3b and the parallel flat plate half mirror 4 and is refracted in the direction orthogonal to the information recording face of the optical disk 10 by the total reflection mirror 5. The beam A of laser light refracted by the total reflection mirror 5 is made to constitute the parallel beam by the collimator lens 6 and deflected from elliptically polarized light to linearly polarized light by the quarter-wave plate 7 and the beam of laser light deflected to linearly polarized light is converged to the information recording face of the optical disk 10 having the thickness of 1.2 mm, that is, to the position at the depth of 1.2 mm of the inner face of CD by the object lens 8. Further, the reflected light of laser light reflected by the information recording face of the optical disk 10 of CD is returned in the reverse direction through the optical system of the object lens 8, the quarter-wave plate 7, the collimator lens 6, the total reflection mirror 5 and the parallel flat plate half mirror 4 and is refracted in the direction of the optical detecting element 9 by the parallel flat plate half mirror 3b and reflected light from the information recording face of the optical disk 10 of CD is detected by the optical detecting element 9 and information recorded to the information recording face of CD is read.

The parallel flat plate half mirror 3b is a parallel flat plate half mirror of the optical glass material BK7 having a thickness of t1=2.45 mm. As shown by FIG. 2, the parallel flat plate half mirror 3b is arranged by being rotated by an angle of $\theta 1=45°$ around x axis orthogonal to the optical axis of z axis of the beam A of laser light. Further, as shown by FIG. 2, the parallel flat plate half mirror 4 is arranged at the position separated from the parallel flat plate half mirror 3b by the distance of d=8 mm on the optical axis of the beam A of laser light by being rotated around y axis orthogonal to the optical axis of z axis of the beam A of laser light by the angle of $\theta 2=45°$. When the parallel flat plate half mirror 3b and the parallel flat plate half mirror 4 of the optical glass material BK7 are arranged in a relationship of being twisted by an angle of 90° at the position on the optical axis of the beam A of laser light to be separated from each other by the distance of d=8 mm, by constituting the thickness of the parallel flat plate half mirror 3b by t1=2.45 mm, constituting the thickness of the parallel flat plate half mirror 4 by t2=2.5 mm, canceling astigmatism of the beam A of laser light emitted from the laser diode 1 by the parallel flat plate half mirror 3b and the parallel flat plate half mirror 4 and adjusting the optical system such that a direction of generating comma aberration becomes the radial direction of the optical disk 10, comma aberration generated in the radial direction of the optical disk 10 can be corrected by the tilt angle of the optical axis of the lens system comprising the collimator lens 6, the quarter-wave plate 7 and the object lens 8 of the optical pickup apparatus, or the tilt angle of the optical axis of the optical pickup apparatus can be corrected by the tilt angle correcting actuator 100 and therefore, when the beam A emitted from the laser diode 1 is converged to the information recording face of the optical disk 10, the excellent spot light eliminating astigmatism and comma aberration can be provided.

On the other hand, the laser diode 2 is arranged such that the beam B of laser light having the wave length of 660 nm emitted from the laser diode 2 is refracted by the parallel flat plate half mirror 4 to coincide with the optical axis of the beam A of laser light emitted from the laser diode 1. The beam B of laser light emitted from the laser diode 2 is refracted by the parallel flat plate half mirror 4 and refracted in the direction orthogonal to the information recording face of the optical disk 10 by the total reflection mirror 5. Similar to the beam A of laser light, the beam B of laser light refracted by the total reflection mirror 5 is made to constitute the parallel beam by the collimator lens 6 and deflected from elliptically polarized light to linearly polarized light by the quarter-wave plate 7, and a beam of laser light deflected to linearly polarized light is converged to the information recording face of the optical disk 10 of DVD having the thickness of 1.2 mm, that is, to the position at the depth of 0.6 mm of the inner face of DVD by the object lens 8. Further, reflected light of laser light reflected by the information recording face of the optical disk 10 of DVD is returned in the reverse direction through the optical system of the object lens 8, the quarter-wave plate 7, the collimator lens 6, the total reflection mirror 5 and the parallel flat plate half mirror 4 and refracted in the direction of the optical detecting element 9 by the parallel flat plate half mirror 3b, and reflected light from the information recording face of the optical disk 10 of DVD is detected by the optical detecting element 9 and information recorded to the information recording face of DVD is read. Further, the beam B of laser light emitted from the laser diode 2 does not transmit through the parallel flat plate half mirror 4 and therefore, aberration is not generated.

According to the second embodiment, by arranging the parallel flat plate half mirror 3b of BK7 having the thickness of 2.5 mm on the optical axis of the beam A of laser light by being rotated around x axis by the angle of $\theta 1=45°$, arranging the parallel flat plate half mirror 4 of BK7 having the thickness of 2.5 mm at the position on the optical axis of the beam A of laser light separated from the parallel flat plate half mirror 3b by the distance of 8 mm by being rotated in the counterclockwise direction around y axis by the angle of $\theta 2=45°$, and adjusting the tilt angle of the optical axis of the lens system comprising the collimator lens 6, the quarter-wave plate 7 and the object lens 8 of the optical pickup apparatus, or the tilt angle of the optical axis of the total of the optical pickup apparatus by the tilt angle correcting actuator, excellent spot light of the beam A of laser light emitted from the laser diode 1 can be converged to the information recording face of the optical disk 10 and therefore, similar to the above-described first embodiment, the excellent spot light of laser light reducing cost by a small number of pieces of parts and eliminating astigmatism and comma aberration without using an expensive optical part and without deteriorating the function of the optical pickup apparatus.

Although a detailed description has been given of the best mode for carrying out the invention as described above, the invention is not limited thereto but can be modified or improved within a normal range of knowledge of the skilled person. For example, although an explanation has been given of canceling astigmatism of the beam of laser light refracted to transmit the two parallel flat plate half mirrors by adjusting the thicknesses and the angles of the two parallel flat plate half mirrors of the optical glass material BK7 and arranging the two parallel flat plate half mirrors at the positions on the optical axis of the beam of laser light separated from each other by the predetermined distance, even when using two parallel flat plate half mirrors of other optical glass material having a different refractive index, by pertinently adjusting a separated distance, thicknesses and angles, astigmatism of the beam of laser light refracted to transmit the two parallel flat plate half mirrors can be cancelled.

As described above with reference to the embodiments, there can be provided excellent spot light of the beam of laser beam by reducing cost by a small number of pieces of parts and eliminating the astigmatism and the comma aberration without using an expensive optical part and without deteriorating a function of the optical pickup apparatus.

Although the present invention has been shown and described with reference to a specific preferred embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. An optical pickup apparatus comprising:
   a first laser diode that emits a first laser beam having a first wave length;
   a second laser diode that emits a second laser beam having a second wave length that is different from the first wave length;
   a first parallel flat plate half mirror arranged on an optical axis of the first laser beam for refracting and transmitting the first laser beam therethrough, the first parallel flat plate half mirror being rotated by an angle of 45° around a first axis orthogonal to the optical axis of the first laser beam and having a first refractive index;
   a second parallel flat plate half mirror arranged on the optical axis of the first laser beam that is transmitted through the first optical element for refracting and transmitting the first laser beam therethrough, and arranged on an optical axis of the second laser beam for refracting the second laser beam to coincide the optical axis of the second laser beam with the optical axis of the first laser beam, the second parallel flat plate half mirror being arranged at a position separated from the first parallel flat plate half mirror by a predetermined distance on the optical axis of the first laser beam, being rotated by an angle of 45° around a second axis orthogonal to the optical axis of the first laser beam and the first axis, and having a second refractive index; and
   a tilt angle correcting unit that corrects a tilt angle of an optical system including the first and the second parallel flat plate half mirror and cancels a comma aberration generated in a radial direction of an optical disk,
   wherein:
   the first and the second parallel flat plate half mirrors are made of a same optical material; and
   the first parallel flat plate half mirror is thinner than the second parallel flat plate half mirror so as to cancel an astigmatism of the first laser beam.

2. The optical pickup apparatus according to claim 1, wherein the first and the second parallel flat plate half mirror are made of an optical glass material BK7.

3. The optical pickup apparatus according to claim 1, wherein the first parallel flat plate half mirror has a thickness of 2.45 mm, and
   wherein the second parallel flat plate half mirror has a thickness of 2.5 mm arranged to be separated from the first optical element by a distance of 8 mm on the optical axis of the beam of the first laser light.

* * * * *